United States Patent [19]
White et al.

[11] Patent Number: 5,293,496
[45] Date of Patent: Mar. 8, 1994

[54] INHIBIT WRITE APPARATUS AND METHOD FOR PREVENTING BUS LOCKOUT

[75] Inventors: Theodore C. White, Tustin; Jayesh V. Sheth, Mission Viejo; Dan T. Tran; Paul B. Ricci, both of Laguna Niguel, all of Calif.

[73] Assignee: Unisys Corporation, Blue Bell, Pa.

[21] Appl. No.: 3,352

[22] Filed: Jan. 12, 1993

[51] Int. Cl.⁵ .............................................. G06F 13/36
[52] U.S. Cl. ............................... 395/325; 364/DIG. 1; 364/242.92; 364/228.1; 364/231.7; 364/243.41
[58] Field of Search ............... 395/325, 425, 650, 725; 364/DIG. 1 MS File

[56] References Cited

U.S. PATENT DOCUMENTS

| | | | |
|---|---|---|---|
| 4,831,581 | 5/1989 | Rubinfeld | 364/DIG. 1 |
| 5,072,369 | 12/1991 | Theus et al. | 395/425 |
| 5,091,845 | 2/1992 | Rubinfeld | 395/425 |

*Primary Examiner*—Thomas M. Heckler
*Attorney, Agent, or Firm*—Albert B. Cooper; Charles J. Fassbender; Mark T. Starr

[57] ABSTRACT

A User bus lockout prevention mechanism for use in a time-shared busy multiple bus User, computer architecture where bus Users include private cache systems which perform a cache cycle when a WRITE TO MEMORY instruction occurs on the bus to determine if data cached from main memory has been overwritten in main memory. A User can be locked out from use of the bus if a synchronism occurs between repetative cache cycles and periodicity of the Retry mechanism of the User. Bus lockout is prevented by the User with the cache issuing an INHIBIT WRITE to the bus when a cache cycle is being performed. Other Users inhibit issuing WRITE TO MEMORY requests to the bus until the INHIBIT WRITE signal terminates. Bus requests other than a write request may be issued to the bus during INHIBIT WRITE.

12 Claims, 5 Drawing Sheets

INHIBIT WRITE APPARATUS AND METHOD FOR PREVENTING BUS LOCKOUT

CROSS-REFERENCE TO RELATED APPLICATION

Co-pending U.S. patent application Ser. No. 08/002,566; filed Jan. 11, 1993, entitled "Varying Wait Interval Retry Apparatus And Method For Preventing Bus Lockout"; by Theodore C. White et al.; assigned to the assignee of the present invention. Said Ser. No. 08/002,566 is incorporated herein by reference.

BACKGROUND OF THE INVENTION

1. Field of the Invention

The invention relates to time-shared bus computer architecture having bus Users with private cache storager, particularly with respect to bus access by Users during cache consistency procedures.

2. Description of the Prior Art

Present day digital computers often utilize a time-shared bus architecture including plural bus Users with one or more Users having a private cache. This architecture typically includes an I/O module User, one or more processor Users and a main memory User. An arbiter on the bus traditionally arbitrates the bus requests from the Users and the bus grants thereto. In operation, a User with a cache copies words from main memory into its cache and performs processes using the words in cache. For example, a processor User may copy program instructions and data from main memory to its cache and, thereafter, execute the program task from cache. As is appreciated, cache is used in this manner to enhance performance. The processor User with the cache avoids going back and forth on the bus to main memory for each instruction.

While a first User is performing processes with its cache, a second User may write to main memory in the locations copied by the first User into its private cache, rendering the cached words from the overwritten locations invalid. In order to maintain cache consistency, the first User monitors the bus and when a write to memory is detected from the second User, the first User executes a cache cycle to determine if it has data from the write-addressed main memory location. If so, the first User invalidates its cache so that the invalid data is not subsequently used. Typically, the execution time of a cache cycle occupies a significant number of bus cycles. Thus, while a cache cycle is executing, the second User, or a third User, can put another request on the bus to do another memory write while the first User is occupied with the original memory write.

In a particular design initially tried by the present inventors in the development of a computer system utilizing the above described architecture, the first User put a RETRY signal on the bus advising the second/third User to retry its memory write request at a later time and the second/third User included a Retry mechanism that retried the bus request at a fixed time interval after receiving the RETRY signal. Additionally, the User Retry mechanism included logic to establish a limit on the number of sequential retries that could be attempted before a decision was made that a malfunction had occurred. When such a malfunction was detected, the process was aborted and an error message generated.

The present inventors discovered that, although a User may indicate a Retry-Limit-Exceeded error condition, the condition was not caused by a malfunction. Instead, a rarely occurring synchronism between repetitive WRITES TO MEMORY by a first bus User, the concomitant cache cycles of a second bus User and the Retry mechanism in a third bus User, resulted in the apparent "failure" of the third bus User. The third bus User was forced to retry its bus operation beyond its Retry Limit. This failure mechanism; herein denoted as bus lockout; will be described later in greater detail.

The occurrence of bus lockout may be exacerbated since the sending of the RETRY signal is repeated when numerous bus Users attempt WRITES TO MEMORY via the bus during a cache cycle. Furthermore, each of numerous bus Users can have a cache, thus causing numerous RETRY signals to be sent.

SUMMARY OF THE INVENTION

The present invention resolves the bus lockout problem of the computer system described above.

In accordance with the invention, a User, with a cache, monitors the bus for a WRITE TO MEMORY and performs a cache cycle in response thereto. While the cache cycle is in process#the User with the cache raises an INHIBIT WRITE (IW) signal on the bus. Other Users, in response to IW, inhibit WRITE TO MEMORY requests and subsequently issue such inhibited requests when IW drops. During IW, the other Users issue all other bus requests, such as MEMORY READ. In this manner, synchronous conditions that would engender bus lockout do not occur.

DESCRIPTION OF THE PREFERRED EMBODIMENT

Figure 1:
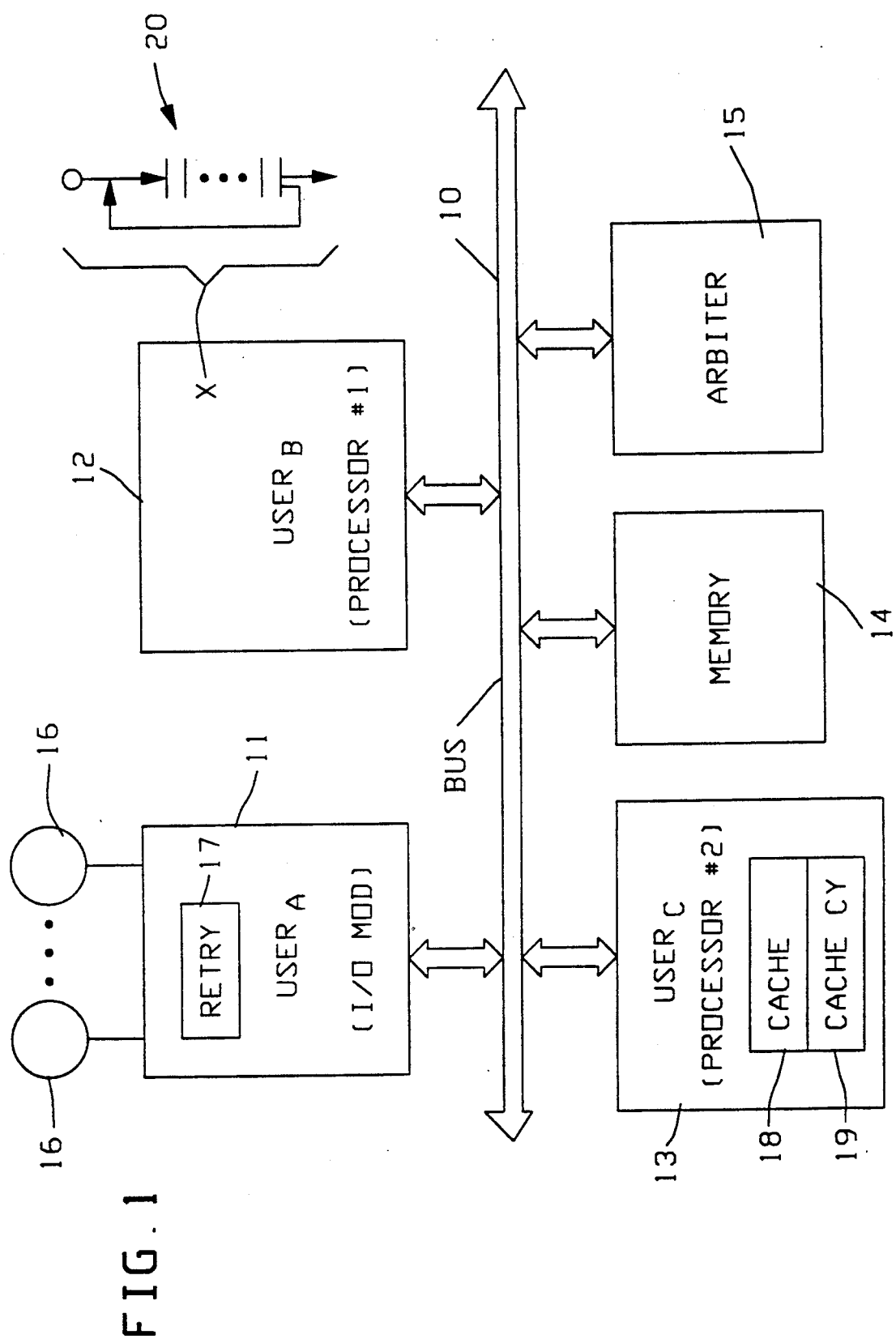
FIG. 1 is a schematic block diagram illustrating a time-shared bus computer architecture in which bus lockout can occur.

Referring to FIG. 1, a computer system is illustrated utilizing a bus 10 time-shared among bus Users 11, 12 and 13; denoted as User $_A$, User$_B$ and User$_C$, respectively. A main memory 14 and a bus arbiter 15 are also coupled to the bus 10. The arbiter 15 controls the access to the bus of the Users 11-13 via bus grants thereto in response to bus requests therefrom.

The User 11 may, for example, be an Input/Output module coupling peripherals 16 into the system. The peripherals 16 may include disk, tape, printer, and the like. User 11 includes a conventional Retry mechanism 17. The Retry mechanism 17, after a certain fixed time interval T$_{WAIT}$, retries a bus request issued by the User 11 in response to a RETRY signal on the bus 10. It is appreciated that Users 12 and 13 also include similar Retry mechanisms.

The memory 14 is the main memory of the illustrated computer system and stores the user software instructions and data for the operations to be performed by the computer system.

The bus Users 12 and 13 may, for example, comprise two microprocessors for concurrent execution of programs. User 13 is illustrated as including a cache memory system 18. The cache 18 includes a fast memory for storing instructions and data read from the main memory 14 by the User 13, so that the User 13 can operate thereupon without requiring numerous accesses to the bus 10 and the main memory 14. As is appreciated, a significant enhancement in performance is achieved by this arrangement. The cache 18 also includes a cache cycle control mechanism 19 to be later described. It is appreciated that each of the other Users on the bus 10 can also include a cache memory system similar to the cache 18.

The bus 10 is a conventional time-shared bus having data lines to transmit data, request lines for the Users 11-13 to acquire the bus, and a grant line granting a User access to the bus. The arbiter 15, in response to the User bus requests, controls the bus grants and implements a priority system for resolving bus contention when two or more Users simultaneously request access to the bus. The arbiter 15 preferably utilizes a priority assignment protocol that tends to grant equal bus access to all the bus Users.

As schematically indicated, the User 12 may be executing a program that has a loop 20 with the computer instructions of the loop represented by the horizontal lines. One of the computer instructions may be the WRITE TO MEMORY. The loop 20, of length $T_{LOOP}$, may be executed thousands of times and the program may include thousands of such loops of different lengths. Execution of a loop of this type in conjunction with the operation of the Retry mechanism 17 results in the User 11 experiencing bus lockout in a manner to be described.

As discussed above, invalid data in the cache 18 would result if another User, such as User 11, would write data into locations in the memory 14 from which the User 13 had cached data. The conventional approach to prevent this invalid data, is the performance of the cache cycle. The User 13 monitors the bus 10 for writes to the memory 14 and when a WRITE TO MEMORY instruction is detected, the cache cycle control mechanism 19 is invoked. The control mechanism 19 checks the cache 18 to determine if it is storing data from the memory location that the WRITE TO MEMORY addressed. Typically, the cache cycle spans numerous bus cycles. Thus, while the cache cycle control mechanism 19 is performing the cache cycle, the User 13 may detect a bus request for a WRITE TO MEMORY from, for example, the User 11. In response to this request, the User 13 issues a RETRY onto the bus 10 because the cache cycle control mechanism is busy doing a cache cycle. In response to the RETRY signal, the User 11 invokes the Retry mechanism 17 and then proceeds to perform some other task. The Retry mechanism 17 is designed to retry the request after a predetermined time interval $T_{WAIT}$ has elapsed. When the cache cycle control mechanism 19 detects invalid data because the location in memory 14 from which the data was copied has been overwritten, the User 13 marks that data in the cache as being invalid. At a later time, when the User 13 wishes to use the data, it accesses the main memory 14 to update the cache 18 with the new information.

Figure 2:
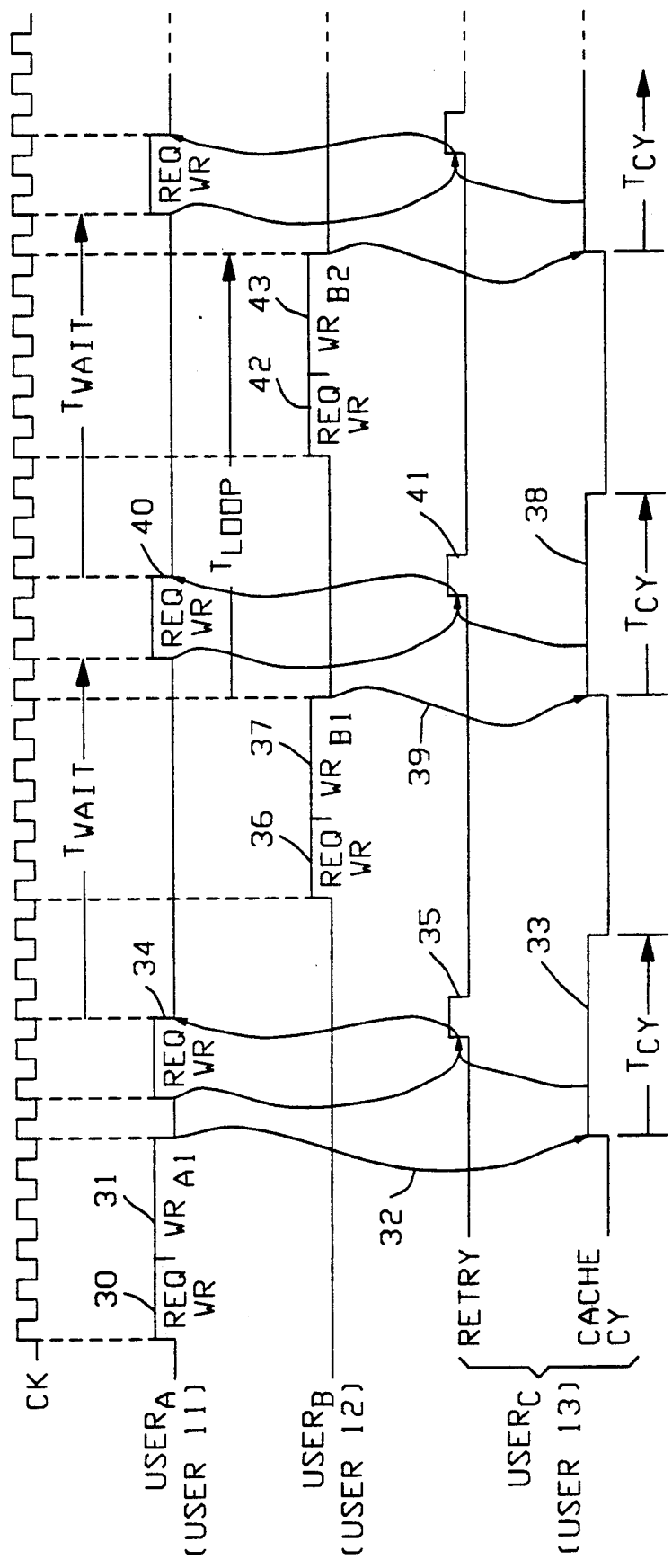
FIG. 2 is a waveform timing diagram illustrating the bus lockout problem.

As discussed above, a rarely occurring synchronism between the operation of the Retry mechanism 17 and the execution of the loop 20 can result in bus lockout with respect to the User 11. This phenomenon is illustrated in FIG. 2. Referring to FIG. 2, with continued reference to FIG. 1, the first line illustrates the system clock (CK) which is a signal on the bus 10. All occurrences on the bus 10 are in synchronism with CK. The second and third lines of FIG. 2 illustrate the operations performed by Users 11 and 121 respectively, and the last two lines of FIG. 2 illustrate the operations performed by User 13.

As illustrated, User 11 issues a request 30 to do a WRITE TO MEMORY, obtains the bus 10 and executes the WRITE TO MEMORY 31. The nomenclature $WR_{A1}$ denotes that User 11 ($User_A$) executes the first WRITE TO MEMORY. As indicated by arrow 32, User 13 executes a cache cycle 33 in response to the WRITE TO MEMORY 31. The cache cycle 33 is illustrated as being performed in a time interval $T_{CY}$.

Following the WRITE TO MEMORY 31, the User 11 issues a second request 34 for another WRITE TO MEMORY. In the embodiment exemplified in FIG. 1, User 11 is an I/O module that may be receiving data from disk and attempting to stream the information into memory 14. This write request 34, however, occurs when User 13 is busy executing cache cycle 33. Consequently, User 13 informs user 11 to retry the write request 34 by issuing a RETRY signal 35 onto the bus 10. User 11 receives the RETRY signal 35 and, in response thereto, invokes the Retry mechanism 17 (FIG. 1) having the Retry interval $T_{WAIT}$. Thus, the User 11 does not perform the write operation pursuant to the request 34, but instead may perform some other task or simply do nothing before returning after $T_{WAIT}$, again to issue the bus request for the write.

Meanwhile, the cache cycle 33 completes in User 13 and User 12 coincidentally issues a request 36 for a WRITE TO MEMORY. Since the user 13 has completed the cache cycle 33, the bus is granted to the User 12 to perform WRITE TO MEMORY 37 pursuant to the request 36. The write 37 is denoted as $WR_{B1}$ or the first write for User 12 ($User_B$). The WRITE TO MEMORY 37 initiates another cache cycle 38 in User 13, as indicated by arrow 39. In accordance with the Retry mechanism 17, User 11 returns with request 40 to perform the previous write, but again User 13 is busy with cache cycle 38. As before, User 13 broadcasts RETRY signal 41, again causing User 11 to invoke the Retry mechanism 17. This sequence continues with User 12 again intervening with request 42 and write 43 which again denies the bus to User 11. Should this sequence continue for a long period of time, the User 11 is effectively locked out from use of the bus; and that can cause an apparent system malfunction.

As discussed above with respect to FIG. 1, the bus lockout of User 11 may result from a synchronism between the execution of the loop 20 and the operation of the Retry mechanism 17. It is appreciated from FIG. 2, that if the WRITES TO MEMORY 37, 43, etc. of User 12 are regularly occurring with periodicity $T_{LOOP}$, as part of the execution of the loop 20, and the bus requests 34, 40, etc. of User 11 are periodically occurring with periodicity $T_{WAIT}$, because of the operation of the Retry mechanism 17, the User 11 can become locked out from use of the bus 10 for an unacceptably long period of time.

It is appreciated that such synchronism will be a rarely occurring phenomenon. User 12 may be executing thousands of loops containing the WRITE TO MEMORY instruction, the loops being of different and arbitrary lengths. Most of the loops will be of the wrong length to result in such synchronism. There may, however, be one loop of precisely the appropriate length to result in the bus lockout situation.

Other phenomena may also cause the bus lockout condition to occur. For example, the Input/output module 11 may be streaming data into the memory 14 utilizing a long string of regularly occurring WRITES TO MEMORY. Another User may have regularly occurring bus requests so synchronized with the operation of the Input/Output module 11 as to be locked off the bus. Such regularly occurring requests may result from the Retry mechanism of the other User.

Figure 3:
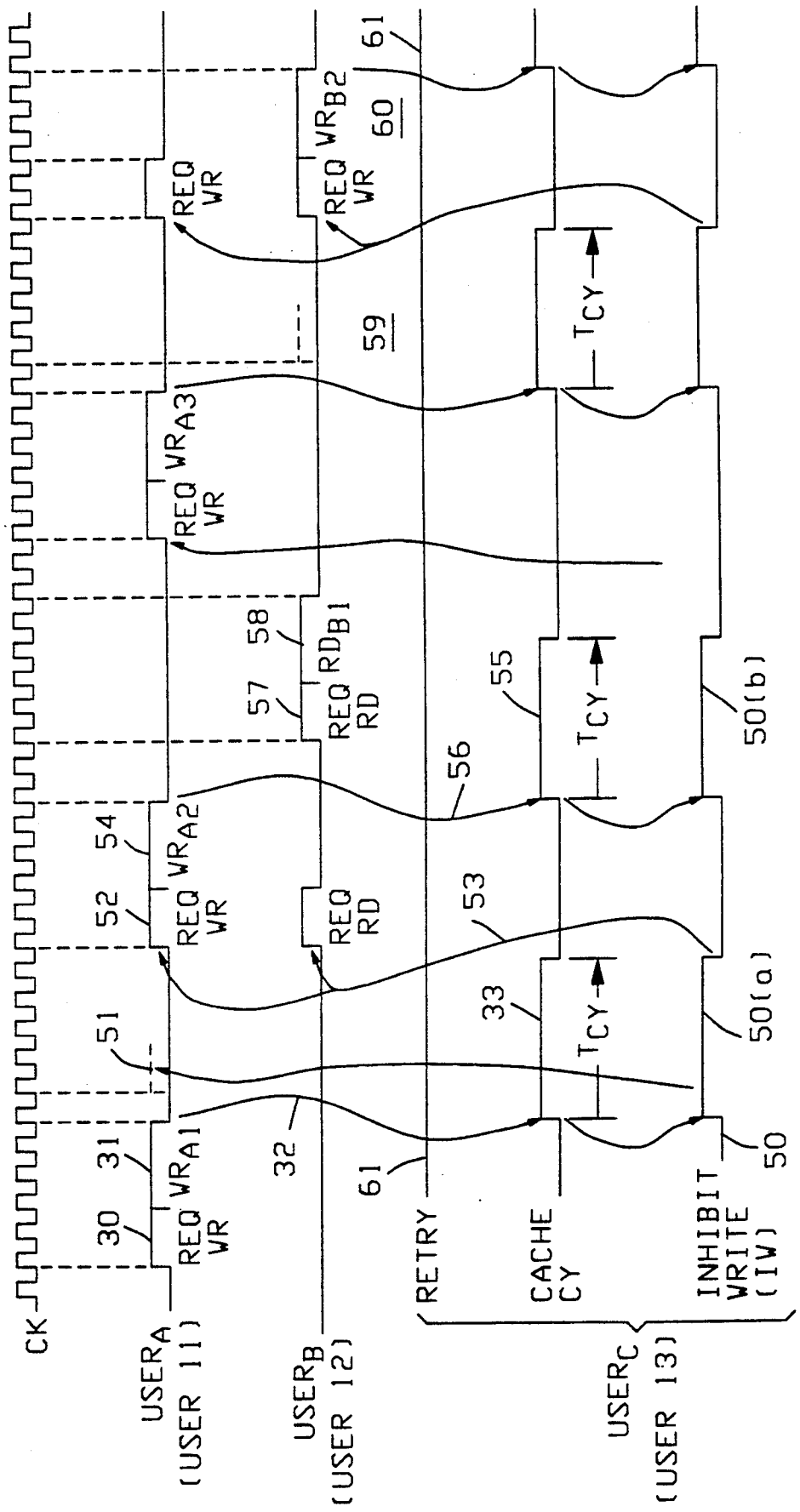
FIG. 3 is a waveform timing diagram illustrating operation in accordance with the invention.

Referring to FIG. 3, with continued reference to FIG. 1, operation of the FIG. 1 system pursuant to the invention is illustrated. In accordance with the invention, the RETRY signal is no longer utilized as described above, but instead, a new signal, INHIBIT WRITE (IW) 50, is employed. The IW signal 50 is broadcast on the bus 10 by the User 13 during the occurrence of a cache cycle. In response to IW 50, the Users inhibit requests for the bus to do memory writes until the IW 50 signal terminates. The Users can, however, request the bus for any other purpose (e.g., main memory reads) when IW 50 is true. If, when IW 50 terminates, multiple Users request the bus, the arbiter 15 grants the bus equally to all Users so that no User becomes locked off the bus.

In FIG. 3, the top line illustrates the clock CK, the second line illustrates the operations performed by User 11, the third line illustrates the operations performed by the User 12 and the last three lines illustrate the operations performed by the User 13. In the manner described above with respect to FIG. 2, User 11 requests the bus 10 pursuant to request 30 and in response to bus grant, executes the WRITE TO MEMORY 31. Again, as indicated by the arrow 32, the User 13 performs cache cycle 33 in response to the write 31. In accordance with the invention, the User 13 broadcasts the IW signal 50 on the bus (as indicated by 50a) which is received by all of the bus Users. The presence of the IW signal informs each bus User that it can request to use the bus 10 and, in fact, use the bus for any purpose other than a WRITE TO MEMORY.

During the occurrence of IW 50(a), User 11 desires to request the bus 10 for a second WRITE TO MEMORY but inhibits this request as indicated at 51. User 11 monitors the IW signal 50 and as soon as the cache cycle 33 ends, the User 13 drops the IW 50(a) signal and User 11 immediately raises request 52 to execute the second WRITE TO MEMORY. At the same time, User 12 can issue a request, such as a request to perform a READ TO MEMORY, as illustrated. These operations are indicated by arrow 53. The arbiter 15 grants the bus to the User 11 which executes the second WRITE TO MEMORY 54.

In response to the write 54, User 13 performs cache cycle 55, as indicated by arrow 56, which results in User 13 raising IW 50(b) on the bus. While IW 50 is true, as illustrated at 50(b), User 12 again sends the read request at 57 which, in accordance with the invention, is not inhibited by IW. After the User 12 executes the read instruction 58, User 11 returns to request and perform a third WRITE TO MEMORY. The resulting sequence of operations 59 is identical to that previously described by reference numerals 30-33, 50(a), 51 and 53 and simply runs to completion.

As indicated at 60, both Users 11 and 12 then request the bus to execute a WRITE TO MEMORY, but this time the arbiter 15 grants the bus to the User 12 rather than to the User 11, as before, pursuant to bus request 52. In this manner, no User is locked off the bus. It is appreciated by reference numeral 61, that the RETRY signal does not perform any function in the described operations.

Figure 4:
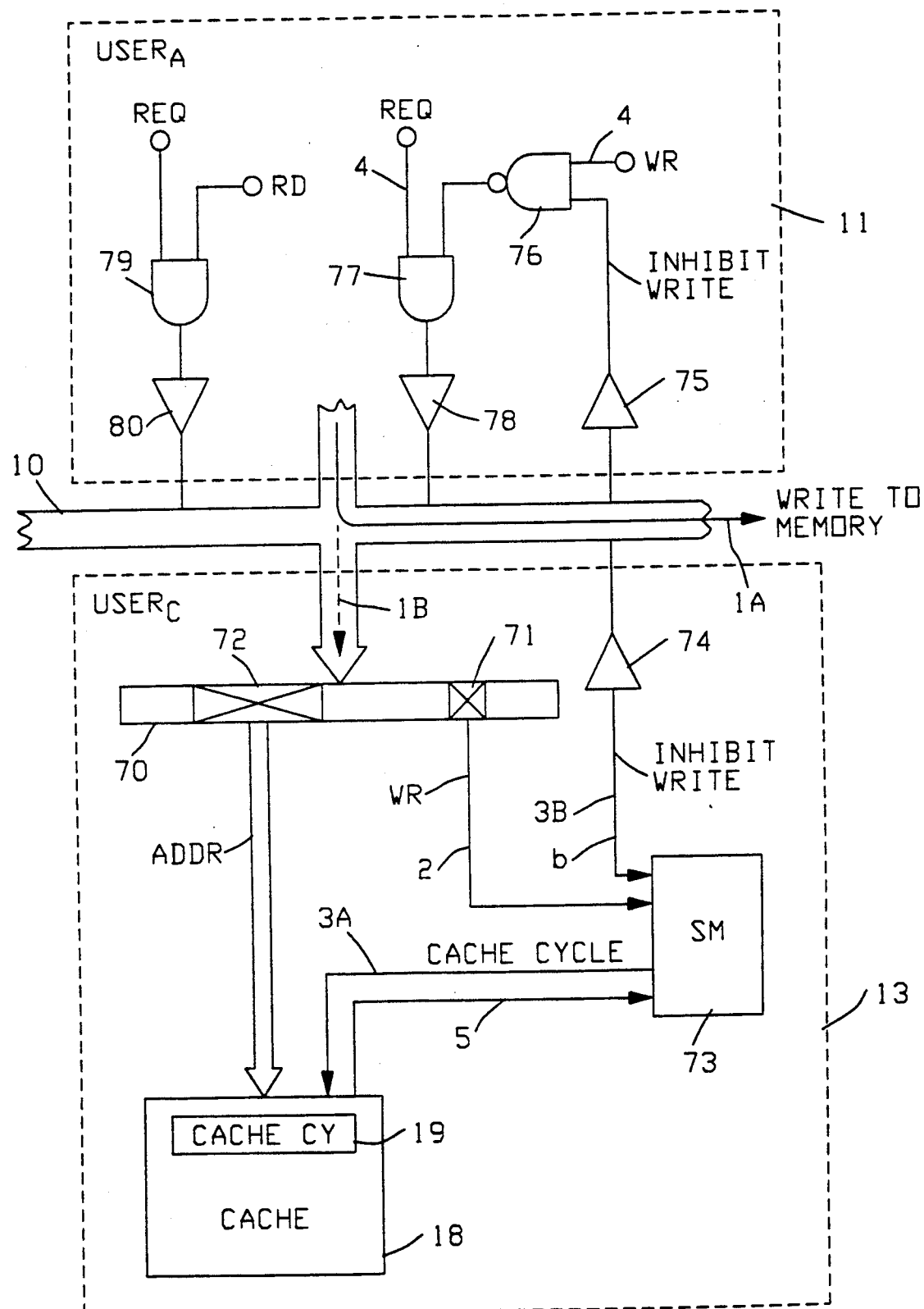
FIG. 4 is a schematic block and logic diagram illustrating preferred apparatus for practicing the invention.

Referring to FIG. 4, in which like reference numerals indicate like components with respect to FIG. 1, apparatus for performing the functions illustrated in FIG. 3 is depicted. Sequence numbers (less than 10) indicate the sequence in which the operations are performed and the signals are flowing with respect to Users 11 and 13. The sequence number 1A indicates that User 11 is executing a WRITE TO MEMORY. The WRITE TO MEMORY instruction 1A issued by the User 11 on the bus 10 includes an op code portion which contains the WRITE op code and an address portion that contains the address in memory to be written. The sequence number 1B indicates that while the WRITE TO MEMORY 1A is occurring, User 13 stores the requisite operation and address information in a register 70. These parameters are stored in sections 71 and 72 of the register 70, respectively.

As indicated by the sequence number 2, the op code information stored in register portion 71 is applied as an input to a state machine 73. When the state machine 73 detects, on the bus 10, that a WRITE TO MEMORY has occurred, the state machine 73, in accordance with sequence numbers 3A and 3B, issues the cache cycle and IW signals, respectively. Pursuant to sequence number 3A, the cache cycle signal from the state machine 73 instructs the cache cycle control mechanism 19 to perform a cache cycle to determine if the address in the address portion 72 is in the cache 18. At the same time, the state machine 73 issues the INHIBIT WRITE signal as indicated by sequence number 3B. The INHIBIT WRITE signal goes out on the bus 10 through a bus driver 74. The INHIBIT WRITE signal on the bus 10 goes to User 11 via a bus receiver 75.

The INHIBIT WRITE signal from the bus receiver 75 is applied as one input to a NAND gate 76. The second input of the NAND gate 76 is provided by a WRITE signal indicating that User 11 desires to perform a WRITE TO MEMORY. The output of the NAND gate 76 is applied as an input to an AND gate 77 which receives a Request (REQ) signal at a second input thereof. The REQ signal indicates that the User 11 desires to request the bus. The output of the AND gate 77 is applied to the bus 10 through a bus driver 78. Raising the REQ signal applied to the AND gate 77 and the WRITE signal applied to the NAND gate 76 indicates that the User 11 desires to request the bus 10 to execute a WRITE TO MEMORY.

When a write is desired and INHIBIT WRITE is true, the output of the NAND gate 76 disables the AND gate 77 and the write request to the bus is inhibited. This action is indicated by sequence number 4.

When the cache cycle control mechanism 19 completes the cache cycle which determined if the written address was in the cache 18, the cache 18 issues a CACHE CYCLE COMPLETE signal to the state machine 73 as indicated by sequence number 5. In response thereto, the state machine 73 drops the INHIBIT WRITE signal as indicated by sequence number 6. When INHIBIT WRITE is false, the output of the NAND gate 76 enables the AND gate 77. Thus, when the state machine 73 drops the INHIBIT WRITE signal, this signal goes across to User 11 permitting the write request to go out on the bus as indicated by sequence number 7.

Therefore, it is appreciated that, in User 11, the request to use the bus 10 will be inhibited if User 11 desires to do a WRITE TO MEMORY and the INHIBIT WRITE signal is true. It is furthermore appreciated, that a write request initiated by User 11 when INHIBIT WRITE is true will go out to the bus immediately upon INHIBIT WRITE going false.

As discussed above, only the write request is inhibited. For example, the User 11 includes an AND gate 79 responsive to the Request signal and a READ signal denoting that the User 11 desires to request the bus to perform a READ FROM MEMORY operation. This request passes to the bus 10 through a bus driver 80 uninhibited by the INHIBIT WRITE signal.

Although specific logic is illustrated in FIG. 4 to perform the described functions, it is appreciated that equivalent hardware or software can be utilized to the same effect.

An alternative but less desirable embodiment of the invention can be implemented by sending out all requests to the bus, but inhibiting the bus grant internally in User 11 if User 11 is doing a WRITE TO MEMORY and INHIBIT WRITE is true. This adds to the system overhead, since requests are going out to the bus and bus grants are being sent by the arbiter, but the User that made the request cannot accept the grant. Additionally, were the arbiter 15 to implement a fixed priority, the highest priority User can tie up the bus during INHIBIT WRITE.

Figure 5:
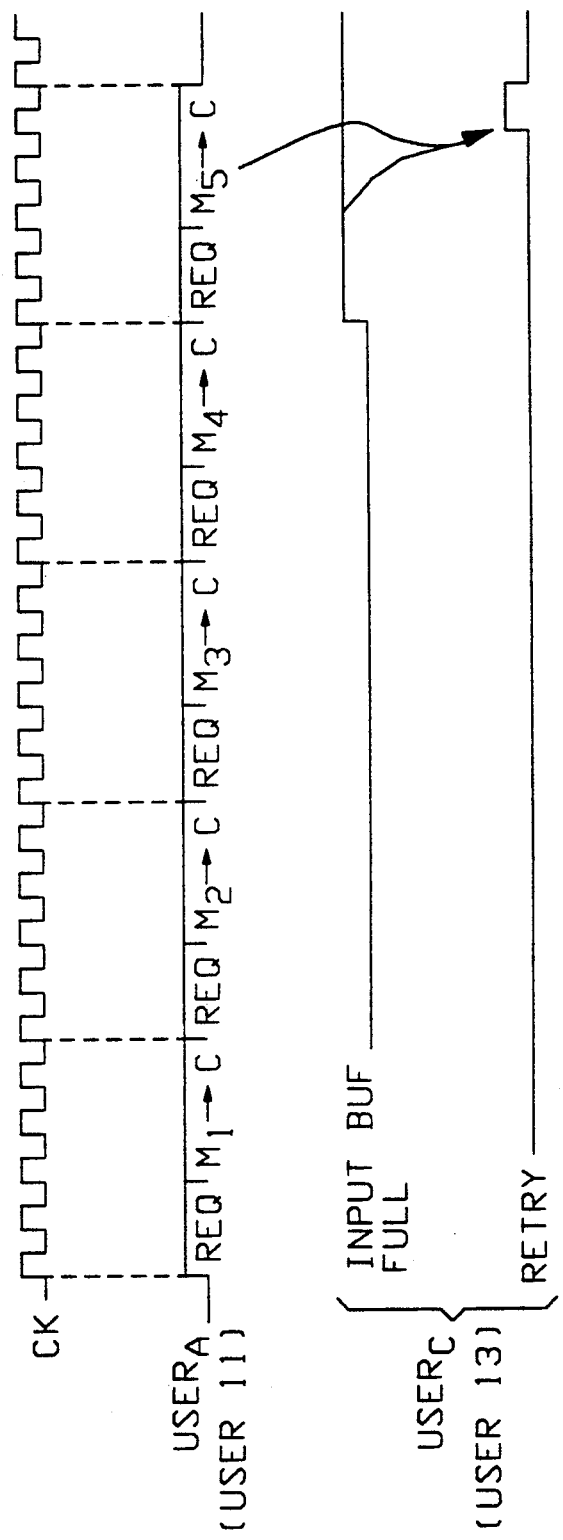
FIG. 5 is a waveform timing diagram illustrating a conventional use of the RETRY signal.

As discussed above with respect to FIG. 3, the RETRY signal is not utilized in the operations depicted therein, as indicated by reference numeral 61. It is appreciated, however, that the RETRY signal is still utilized for other purposes. One such purpose is illustrated in FIG. 5. Referring to FIG. 5, the first line is the system clock CK, the second line depicts operations performed by User 11 and the last two lines of FIG. 5 depict operations performed by User 13. In the scenario depicted by FIG. 5, User 11 is sending messages directly to User 13. The messages are denoted as $M_1$, $M_2$, $M_3$, etc. Eventually, the input buffer of User 13 becomes full, as indicated, and User 13 issues the RETRY signal to advise user 11 to stop sending. messages.

In view of the above, it is appreciated that the INHIBIT WRITE mechanism of the present invention and the Retry mechanism have at least the following principal distinctions:

1. The RETRY signal does not inhibit any User from placing a request on the bus but informs one User to retry its request currently on the bus irrespective of the type of request. The INHIBIT WRITE signal of the invention inhibits all Users from placing write requests on the bus when INHIBIT WRITE is true but does not inhibit any Users from placing other types of requests on the bus.
2. The Retry mechanism retries a request after a fixed time interval has elapsed. The mechanism of the present invention puts the inhibited write request immediately on the bus as soon as INHIBIT WRITE goes false.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In a computer system having a time-shared bus with a plurality of bus Users and a main memory coupled to said bus, said plurality of bus Users including first and second bus Users, said first bus User operative to issue bus requests to said bus to use said bus and to receive bus grants, granting bus use thereto, said bus requests including a write request to place a WRITE instruction on said bus to write to said main memory at an address specified by said WRITE instructions, said second bus User having a cache memory system for storing words from said main memory, said cache memory system having cache cycle control means for effecting a cache cycle in response to said WRITE instruction, said cache cycle being operative to determine if said cache memory system is storing a word from said main memory from said address specified by said WRITE instruction and to invalidate said word in said cache memory system; bus lockout prevention apparatus comprising inhibit write means in said second bus User for issuing an INHIBIT WRITE signal to said bus during said cache cycle, and inhibiting means in said first bus User for inhibiting said write request in response to said INHIBIT WRITE signal and for issuing said write request to said bus when said INHIBIT WRITE signal terminates.

2. The apparatus of claim 1 wherein said inhibiting means is operative to inhibit only said write request in response to said INHIBIT WRITE signal and not to inhibit said bus requests other than said write request in response to said INHIBIT WRITE signal.

3. The apparatus of claim 1 wherein said inhibit write means comprises detecting means coupled to said bus for detecting said WRITE instruction, thereby providing a detected WRITE instructions, and sequencing means responsive to said detected WRITE instruction for signalling said cache cycle control means to initiate said cache cycle and for simultaneously issuing said INHIBIT WRITE signal to said bus, said cache cycle control means being operative to issue a CACHE CYCLE COMPLETE signal to said sequencing means when said cache cycle completes, said sequencing means being operative in response to said CACHE CYCLE COMPLETE signal to terminate said INHIBIT WRITE signal.

4. The apparatus of claim 3 wherein said sequencing means comprises a state machine.

5. The apparatus of claim 1 wherein said first bus User is operative to generate a REQUEST signal to use said bus and a WRITE signal when a bus request is said write request, and said inhibiting means comprises logic gate means responsive to said REQUEST signal, said WRITE signal and said INHIBIT WRITE signal for inhibiting said REQUEST signal from said bus in the presence of said WRITE signal and said INHIBIT WRITE signal and for issuing said REQUEST signal to said bus in the presence of said WRITE signal and the absence of said INHIBIT WRITE signal.

6. The apparatus of claim 1 further including arbiter means coupled to said bus for assigning bus request priority to said plurality of bus Users in a manner tending to grant equal bus access thereto.

7. In a computer system having a time-shared bus with a plurality of bus Users and a main memory coupled to said busy said plurality of bus Users including first and second bus Users, said first bus User operative to issue bus requests to said bus to use said bus and to receive bus grants, granting bus use thereto, said bus requests including a write request to place a WRITE instruction on said bus to write to said main memory at an address specified by said WRITE instruction, said second bus User having a cache memory system for storing words from said main memory, said cache memory system having cache cycle control means for effecting a cache cycle in response to said WRITE instruction, said cache cycle being operative to determine if said cache memory system is storing a word from said main memory from said address specified by said WRITE instruction and to invalidate said word in said cache memory system; a bus lockout prevention method comprising
   issuing an INHIBIT WRITE signal by said second bus User to said bus during said cache cycle, and
   inhibiting said write request in said first bus User in response to said INHIBIT WRITE signal and issuing said write request to said bus when said INHIBIT WRITE signal terminates.

8. The method of claim 7 wherein said inhibiting step comprises inhibiting only said write request in response to said INHIBIT WRITE signal and not inhibiting said bus requests other than said write request in response to said INHIBIT WRITE signal.

9. The method of claim 7 wherein said issuing step comprises
   detecting said WRITE instruction,
   activating said cache cycle control means to initiate said cache cycle in response to detecting said WRITE instruction and simultaneously issuing said INHIBIT WRITE signal to said bus, and
   terminating said INHIBIT WRITE signal when said cache cycle completes.

10. The method of claim 7 further including arbitrating bus request priority to said plurality of bus Users in a manner tending to grant equal bus access thereto.

11. In a computer system having a time-shared bus with a plurality of bus Users and a main memory coupled to said bus, said plurality of bus Users including first and second and bus Users, said first bus user operative to issue bus requests to said bus to use said bus and to receive bus grants, granting bus use thereto, said bus requests including a write request to place a WRITE instruction on said bus to write to said main memory at an address specified by said WRITE instruction, said second bus User having a cache memory system for storing words from said main memory, said cache memory system having cache cycle control means for effecting a cache cycle in response to said WRITE instruction, said cache cycle being operative to determine if said cache memory system is storing a word from said main memory from said address specified by said WRITE instruction and to invalidate said word in said cache memory system; bus lockout prevention apparatus comprising
   inhibit write means in said second bus User for issuing an INHIBIT WRITE signal to said bus during said cache cycle, and
   inhibiting means in said first bus User for inhibiting placing said WRITE instruction on said bus in response to said INHIBIT WRITE signal and for placing said WRITE instruction on said bus when said INHIBIT WRITE signal terminates.

12. The apparatus of claim 11 further including arbiter means coupled to said bus for assigning bus request priority to said plurality of bus Users in a manner tending to grant equal bus access thereto.

* * * * *